United States Patent [19]

Olsen et al.

[11] Patent Number: 5,251,384
[45] Date of Patent: Oct. 12, 1993

[54] FLUIDIZED BED APPARATUS INCLUDING DOUBLE CHAMBER CARTRIDGE FILTER SYSTEM

[75] Inventors: Kenneth W. Olsen, Montvale; Richard A. Smith, Ringwood, both of N.J.

[73] Assignee: Glatt Air Techniques, Inc., Ramsey, N.J.

[21] Appl. No.: 723,177

[22] Filed: Jun. 28, 1991

[51] Int. Cl.$^5$ ............................................. F26B 21/06
[52] U.S. Cl. ........................................ 34/82; 34/57 A; 34/10; 55/350.1; 55/302
[58] Field of Search ................ 34/10, 57 R, 57 A, 79, 34/82, 60; 55/350, 302

[56] References Cited

U.S. PATENT DOCUMENTS

| | | | |
|---|---|---|---|
| 4,445,913 | 5/1984 | Nishiyama | 55/302 |
| 4,486,205 | 12/1984 | Nishiyama | 55/302 |
| 4,588,366 | 5/1986 | Glatt | 34/10 |
| 4,645,520 | 2/1987 | Huttlin | 55/302 |
| 4,670,993 | 6/1987 | Dunaway | 34/82 |
| 4,697,356 | 10/1987 | Huttlin | 34/82 |
| 4,772,193 | 9/1988 | Glatt | 34/57 A |
| 4,953,308 | 9/1990 | Basten et al. | 34/82 |

*Primary Examiner*—Henry A. Bennet
*Assistant Examiner*—Denise Gromada
*Attorney, Agent, or Firm*—Jacobson, Price, Holman & Stern

[57] ABSTRACT

A fluidized bed apparatus having a downwardly opening filter housing and including multiple processing gas outlets and a partition structure dividing the interior of the filter housing into individual downwardly-opening open-bottom compartments equal in number to the gas outlets. The partition structure extends into an expansion chamber below the filter housing. The partition structure that divides the housing not only extends the full height of the filter housing portion, but projects appreciably downwardly therefrom into the upper portion of the expansion chamber disposed below the filter housing. Each gas outlet is associated with a filter cartridge mounted on a tubular fitting. The gas filter cartridge is tubular and filters the gas passing through each of the divided filter housing compartments. Each gas outlet has an exhaust fitting operatively associated therewith on the exterior of the casing and the exhaust fittings open into multiple arms of a connection fitting through gas flow on/off valves which may be selectively opened and closed. The connection fitting discharges into a discharge duct having a gas flow modulating valve operatively associated therewith. Additionally, each gas outlet and tubular air filter cartridge has a compressed gas supply structure operatively associated therewith whereby appreciable quantities of gas under pressure may be supplied to the interiors of the filter cartridges for cleaning the same when the gas flow on/off valves operatively associated with the corresponding exhaust fittings are closed.

13 Claims, 1 Drawing Sheet

5,251,384

FLUIDIZED BED APPARATUS INCLUDING DOUBLE CHAMBER CARTRIDGE FILTER SYSTEM

BACKGROUND OF THE INVENTION

1. Field of the Invention

This invention relates to a fluidized bed apparatus, such as a particle coater/granulator equipped with a plurality of replaceable filter cartridges which filter the air or gas being discharged from the apparatus. The cartridges are arranged in a divided filter housing. The flow of outlet gas, or process gas, from the fluidized bed is effectively bypassed through a particular cartridge or group of cartridges during a cartridge cleaning operation which is effected by the discharge of high pressure air or gas within the interior of the filter cartridge.

2. Description of Related Art

Various different forms of air filtering systems including bag type systems and cartridge type systems heretofore have been provided such as those disclosed in U.S. Pat. Nos. 4,588,366 and 4,953,308.

With the filter system such as that disclosed in U.S. Pat. No. 4,588,366, a plurality of filter elements must be incorporated for each air filter assembly and the most effective manner of cleaning such a filter system involves mechanical means for effecting vibration of the filter elements during a cleaning operation. The mechanical means which must be provided for vibrating the filter elements during a cleaning operation involves considerable expense and requires a reasonable degree of maintenance.

Filter cartridge systems of the type described in U.S. Pat. No. 4,953,308 utilize high pressure internal air for periodic cleaning of the air filter cartridges. These systems are inefficient in that the multiple filter cartridges are mounted in an undivided upper filter housing and the cleaning of one filter cartridge by the discharge of high pressure air therewithin occurs without interrupting the fluidized bed airflow. This results in inefficient cleaning of the filter surfaces. The discharge of particles from the filter cartridge requires the particles to discharge against a counter-current air flow. These particles are typically the fine particles which have the least chance of resisting the flow of air from the fluidized bed. As a result, to the extent these fine particles are dislodged, they will be drawn back into the cartridge from which they came. Because these particles do not get reintroduced into the fluidized bed, the efficiency of the process is diminished. For example, during an agglomeration process, because some of the fine particles do not get reintroduced, these unagglomerated particles could result in a product having content uniformity problems. Similarly, in a coating process, the particles that do not get reintroduced will result in a product having uncoated particles that will compromise the product performance. Moreover, those particles that do get blown from the exterior of such filter cartridge may be drawn to the exterior of an adjacent filter cartridge which remains in operation, thereby overloading the operational filter cartridge with particles from the cartridge being cleaned. This results in the cartridges having to be cleaned more frequently, which is expensive, as well as having to change the filters more frequently.

SUMMARY OF THE INVENTION

The fluidized bed apparatus of this invention includes a plurality of downwardly open chambers defined in the upper filter housing with each chamber including at least one filter cartridge and gas, or air, outlet. Each outlet is equipped with a gas flow on/off valve downstream from the associated cartridge. These multiple outlets in turn open into a single discharge duct, through a multiple arm connection fitting, which also includes a gas flow controlling valve. Each of the filter cartridges has a gas supply structure provided to discharge gas, such as air, under pressure within the interior of the filter cartridge for cleaning the cartridge.

The downwardly opening chambers are defined by partition structures which extend vertically not only the full extent of the upper filter housing of the apparatus but also downwardly into the lower fluidized bed expansion chamber of the apparatus. By extending the partition structure downwardly into the lower section, particles discharged from the exterior of the filter cartridge fall downwardly through substantially "dead" air or gas space within the corresponding downwardly opening chamber, and thereafter downwardly into the fluidized bed below the bottom of the partition structure. The discharged particles are not discharged against any substantial counter-current process gas flow. In this manner, a considerable portion of the material discharged from the exterior of a cartridge filter during cleaning falls down into the processor thus reintroducing such particles into the system and reducing the amount of particulate that might otherwise migrate to another filter cartridge. Thus, the time interval between having to pulse or clean the cartridges may be increased and the time interval between replacement of filter cartridges may be increased.

A principal object of this invention is to provide a fluidized bed apparatus, such as a particle coater/granulator/agglomerator, with a unique and efficient filtering system utilizing a plurality of cartridge-type air, or other gas, filters, wherein each filter cartridge has a gas supply operatively associated therewith selectively operable to discharge gas under pressure within the interior of the filter cartridge in order to blow or dislodge filtered material accumulated on the exterior of the filter cartridge therefrom.

It is an object of this invention to provide a fluidized bed apparatus, such as a particle coater/granulator/agglomerator, in accordance with the preceding paragraph wherein each of the filter cartridges associated with a gas outlet of the apparatus is contained within a separate downwardly-opening filter housing chamber through the utilization of a partition, or baffle, structure that divides the housing. The partition or baffle structure projects downwardly below the lower limit of the upper filter housing of the apparatus and into the upper portion of the coating or expansion chamber of the apparatus, whereby the material blown from the exterior of one filter cartridge may fall back down into the expansion chamber.

A further object of this invention is to provide a structure for support and easy removal of filter cartridges within the upper filter housing outlet section of a fluidized bed apparatus.

Yet another object of this invention is to provide each gas outlet with a gas flow on/off valve downstream from the filter cartridge whereby the flow of process gas through the filter cartridge may be terminated during a filter cartridge cleaning operation.

Still further, it is an object of this invention to provide multiple outlets of a fluidized bed apparatus, such as a particle coater/granulator, joined into a single discharge duct downstream from the gas flow on/off valves mentioned in the preceding paragraph. The discharge duct, in turn, is provided with a modulating gas flow controlling valve.

Finally, it is an object of this invention to provide a fluidized bed apparatus, such as a particle coater/granulator, equipped with multiple, individual gas outlet filter cartridges which will conform to conventional forms of manufacture, be of simple construction, and be dependable and efficient in operation.

These together with other objects and advantages which will become apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
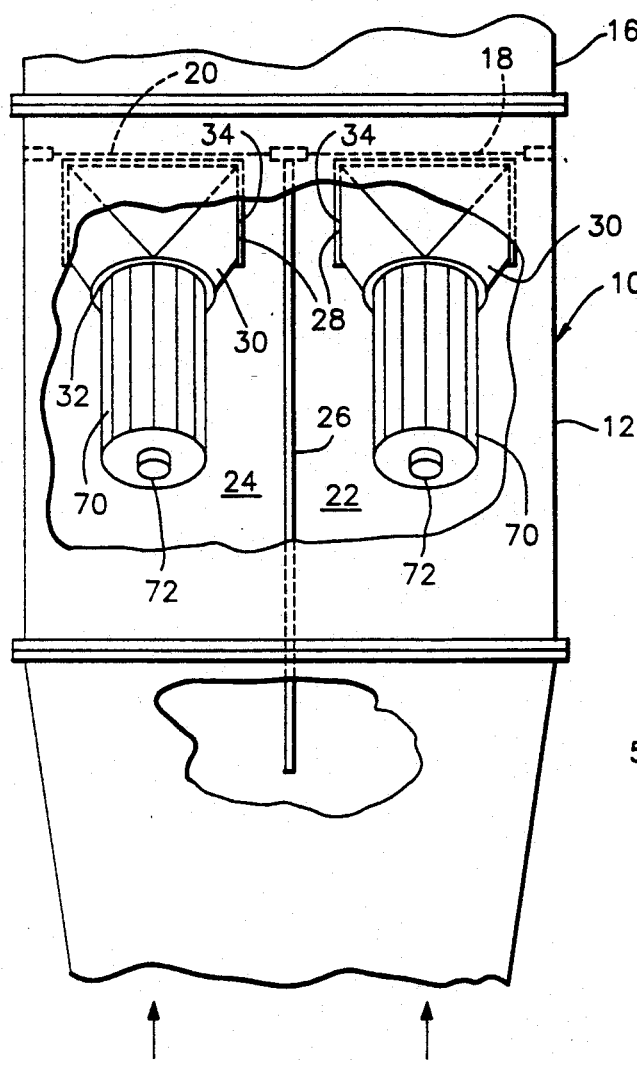
FIG. 1 is a fragmentary schematic front elevational view of a fluidized bed apparatus, such as a particle coater/granulator/agglomerator, with product bottom discharge and with portions of the near housing wall sections being broken away to illustrate more clearly the internal structural features associated with the instant invention.

Referring to the drawings, the numeral 10 generally designates a fluidized bed apparatus, such as a particle coater/granulator of the type hereinbefore set forth. Fluidized bed systems are well known in the art, see e.g., those disclosed in U.S. Pat. Nos. 4,588,366 and 4,953,308. The apparatus 10 includes a hollow upper section or filter housing 12 which opens downwardly into a downwardly tapering expansion or processing chamber 14, the lower end of the processing chamber typically opening downwardly into a product container section (not shown) in turn terminating downwardly in a lower plenum (not shown). In addition, the upper section or filter housing 12 has an upper bonnet 16 disposed thereover comprising an explosion vent, which could be horizontal or vertical. The interior of the upper section or filter housing 12 communicates with the bonnet or explosion vent 16 through normally closed explosion relief plates 18 and 20.

The interior of the upper section or filter housing 12 is divided into a plurality of individual downwardly opening chambers 22 and 24 through the utilization of a vertical partition 26. If the interior of the upper section or filter housing 12 is to be divided into only two chambers as shown, the partition means 26 comprises a substantially diametric partition dividing the interior of the cylindrical filter housing 12 into semi-circular chambers 22 and 24. More than two chambers may be provided with multiple partitions.

Each chamber 22 and 24 includes a fluidizing gas outlet 28 including an internal outlet fitting 30 projecting into the corresponding chamber and having inlet and outlet ends 32 and 34. Each of the gas outlets 28 opens outwardly through the wall of the upper section or filter housing 12 through an exhaust fitting 38. Each fitting 38 discharges through a butterfly-type on/off control valve 40 including a remotely operable actuator 42 opening into one leg 44 of a discharge pipe, or connection filling, 46, in turn discharging into a discharge duct 48 equipped with a continuously, variable, or modulating, butterfly-type air flow control valve 50 including a remotely actuatable operator 52. On/off control valves and modulating type control valves are well known in the art.

A centrally apertured mounting plate 56 is secured to each inlet end 32 and includes three axially extending and peripherally spaced support rods 58 mounted therefrom through the utilization of clamping nuts 60. The ends of the rods 58 remote from the plate 56 are interconnected by a triangular frame 62 including a central hub 64 from which a threaded mounting stud 65, or other type of securing device such as a pin or a clamp, projects outwardly. The plate 56, rods 58 and frame 62 together define a support frame referred to, in general, by the reference numeral 66 over which a cylindrical filter cartridge may be telescoped from the end thereof remote from the plate 56. The frame 66 additionally includes diagonal bracing rods 68 extending from each of the rods 58 adjacent the plate 56 to the hub 64.

A generally cylindrical, or tubular, filter cartridge 70 (e.g., GORE-TEX Membrane-type) is removably telescoped over each support frame 66 and removably secured thereon by a hand nut 72 threadedly engaged with the associated stud 65, or by some other securing device. The filter cartridge 70 is generally open in the central region. Filter cartridges of this configuration are well-known and conventionally used in dust collectors, for example.

As may be seen from FIG. 1, the partition 26 that divides the filter housing extends downwardly and appreciably into the upper end of the expansion or processing chamber 14. This feature supports an important part of the operation of the instant invention, as will be described below. Alternatively, the partition 26 may be divided at the juncture between the filter chamber 12 and the expansion chamber 14 to enable the expansion chamber to be easily separated from the filter chamber. In such case, the portion of the partition in the expansion chamber will extend diametrically across the top part of the chamber and "mate" with the partition of the filter housing. Gasketing would be provided between the edges of the "mated" partitions.

During operation of the apparatus 10, both filter cartridges 70 may be operational in that air or gas being drawn or blown upwardly from the expansion or processing chamber 14 passes into the upper section or filter housing 12 for discharge therefrom through the gas outlets 28. However, the discharging gas must pass through the filter cartridges 70 and, after an indeterminate period of operation, the external surfaces of the filter cartridges 70 accumulate fine particulate materials that are filtered out of the fluidizing gas.

Figure 2:
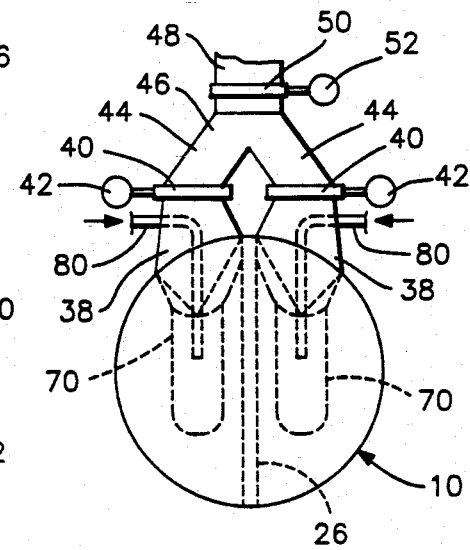
FIG. 2 is a reduced top plan view of the apparatus of FIG. 1.
Figure 3:
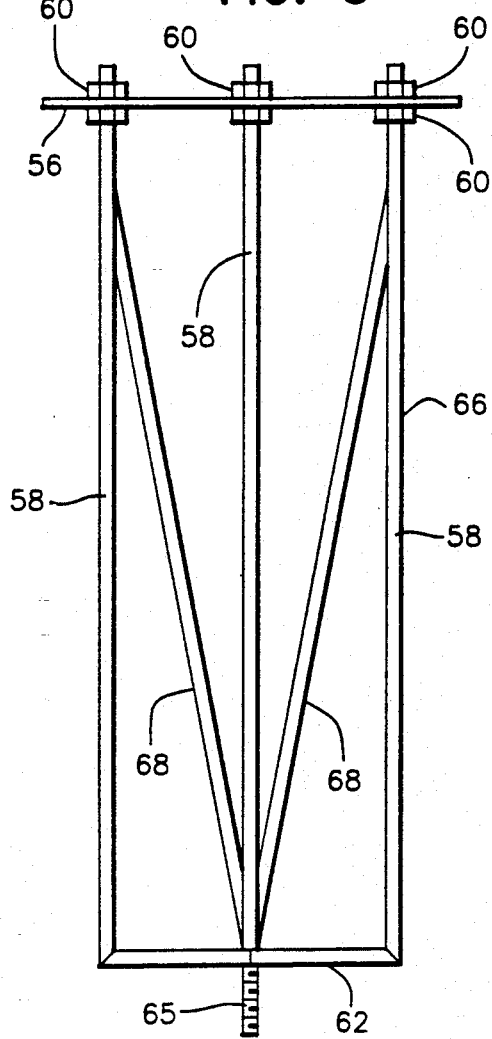
FIG. 3 is an elevational view of one of the gas filter cartridge support frames of the invention over which an associated tubular gas filter cartridge may be removably supported.
Figure 4:
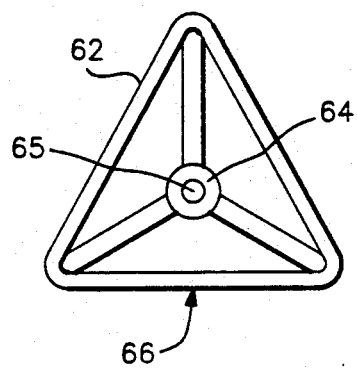
FIG. 4 is an end elevational view of the support frame illustrated in FIG. 3.

When it is desired to clean the filter cartridges 70, a first of the valves 40 is closed thereby terminating the out flow of gas from the corresponding downwardly opening chamber in which the associated filter cartridge is disposed. This renders the downwardly opening chamber relatively "dead" as to gas flow therewithin. Then, gas is supplied to the corresponding gas supply line 80, FIG. 2, wherein gas under pressure passes, or is pulsed, through the supply line 80 into the interior of the now inoperative filter cartridge and through the filter walls to blow coating material or other particulate material from the external surfaces of the filter cartridge. The supply line 80 terminates within the filter cartridge with a nozzle (not shown) to uniformly disperse the purging gas. The discharged materials then fall downwardly through the "dead" chamber and also downwardly through the corresponding upper portion of the expansion or processing chamber 14 and then to a level below the partition 26 into the fluidized bed region of the expansion chamber. The partition 26 serves to enable the fine particles to be discharged without impedance from the processing gas flow and prevents the falling particles from being drawn onto the other filter cartridge. Permitting the particles to fall into the fluidized bed results in a more efficient utilization of the materials and coatings being processed, as well as the lessening of filter clogging. The operational time interval between required changing of the filter cartridges 70 is increased.

The gas pulsing of one cartridge, with its corresponding valve 40 being closed, operates intermittently such that, after cleaning, the valve is opened, gas pulsing stops, and the adjacent filter cartridge may then be cleaned in the same manner. Obviously, there may be a significant pause or delay between the cleaning of one cartridge and the other cartridges. It should be apparent that multiple filter cartridges could be employed in the divided chamber, each of which are simultaneously cleaned. Cleaning of all cartridges at the same time may be accomplished if the fluidization is temporarily interrupted.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A fluidized bed apparatus comprising a filter housing and a processing chamber positioned below said filter housing, means for passing processing gas upwardly through said processing chamber and into said filter housing, said filter housing including partition means for dividing the interior of said filter housing into separate downwardly-opening, open-bottom filter housing compartments, at least one processing gas outlet associated with each filter housing compartment, a filter cartridge mounted in each filter housing compartment adjacent a processing gas outlet, such that processing gas may flow through the cartridge and through the processing gas outlet, cleaning gas input means for selectively introducing high pressure cleaning gas into the interior of the filter cartridge in a direction opposite to the processing gas flow for cleaning the filter cartridge, processing gas flow on/off valve means operatively associated with each processing gas outlet for selectively opening and closing the processing gas outlet downstream from the associated filter cartridge wherein during the introduction of high pressure cleaning gas into the interior of the filter cartridge, the corresponding processing gas outlet is closed.

2. The fluidized bed apparatus of claim 1 wherein said partition means projects within an upper portion of said processing chamber.

3. The fluidized bed apparatus of claim 2 further comprising a tubular, substantially open, fitting associated with the processing gas outlets and projecting into the interior of the filter housing for mounting the filter cartridges thereon.

4. The fluidized bed apparatus of claim 2 wherein said filter housing is cylindrical, and wherein said partition means comprises a single partition disposed substantially along a diametric plane of said filter housing, whereby said open bottom compartments are each generally semi-circular in transverse cross section.

5. A fluidized bed apparatus comprising a filter housing and a processing chamber positioned below said filter housing, means for passing gas upwardly through said processing chamber and into said filter housing, said filter housing including partition means for dividing the interior of said filter housing into separate downwardly-opening, open-bottom filter housing compartments, at least one processing gas outlet associated with each filter housing compartment, said gas outlet opening outwardly of said filter housing into an exhaust fitting projecting outwardly from said casing, said exhaust fitting discharging into a connection fitting including multiple inlets and a single outlet, a substantially cylindrical filter cartridge mounted in each filter housing compartment adjacent a gas outlet such that gas may flow through the cartridge and through the gas outlet, gas input means for selectively introducing high pressure gas into the interior of the filter cartridge for cleaning the filter cartridge, gas flow on/off valve means operatively associated with each gas outlet for selectively opening and closing the gas outlet downstream from the associated filter cartridge wherein during the introduction of high pressure gas into the interior of the filter cartridge, the corresponding outlet is closed, said gas flow on/off valve means associated with each of said gas outlets including a remotely operable butterfly valve for on/off gas flow through said exhaust fitting, said single outlet opening into a discharge duct, said discharge duct including a remotely operable gas flow modulating control valve.

6. A fluidized bed apparatus comprising a filter housing and a processing chamber positioned below said filter housing, means for passing gas upwardly through said processing chamber and into said filter housing, said filter housing including partition means for dividing the interior of said filter housing into separate downwardly-opening, open-bottom filter housing compartments, at least one processing gas outlet associated with each filter housing compartment, a substantially cylindrical filter cartridge mounted in each filter housing compartment adjacent a gas outlet such that gas may flow through the cartridge and through the gas outlet, gas input means for selectively introducing high pressure gas into the interior of the filter cartridge for cleaning the filter cartridge, gas flow on/off valve means operatively associated with each gas outlet for selectively opening and closing the gas outlet downstream from the associated filter cartridge wherein during the introduction of high pressure gas into the interior of the filter cartridge, the corresponding outlet is closed, further comprising a tubular, substantially open, fitting associated with the gas outlets and projecting into the interior of the filter housing for mounting the filter cartridges thereon, wherein each said tubular fitting includes a circular inlet end, a circular mounting plate frame mounted from said circular inlet end, said mounting plate frame including three peripherally spaced and axially extending rods supported therefrom and projecting outwardly of the inlet end of the corresponding tubular fitting, the ends of said rods remote from said circular inlet ends being joined by a triangular frame including a central mounting hub portion, a mounting shank projecting outwardly of said central mounting hub portion, said tubular filter cartridges being telescopingly received over a corresponding set of said rods and means for removably securing said filter cartridges to said mounting shank.

7. Apparatus for treating particulate matter having a processing gas flow therethrough, the apparatus comprising a filter housing and a processing chamber positioned below said filter housing, means for passing processing gas upwardly through said processing chamber and into said filter housing, said filter housing including partition means for dividing the interior of said filter housing into separate downwardly-opening, open-bottom filter housing compartments, at least one processing gas outlet associated with each filter housing compartment, a filter cartridge mounted in each filter housing compartment and interconnected with said processing gas outlet such that processing gas may flow through the cartridge and through the processing gas outlet, cleaning gas input means for selectively introducing high pressure cleaning gas into the interior of the filter cartridge in a direction opposite the processing gas flow for cleaning the filter cartridge, processing gas flow on/off valve means operatively associated with each processing gas outlet for selectively opening and closing the processing gas outlet downstream from the associated filter cartridge wherein during the introduction of high pressure cleaning gas into the interior of the filter cartridge, the corresponding processing gas outlet is closed.

8. The apparatus of claim 7 wherein said partition means projects within an upper portion of said processing chamber.

9. The apparatus of claim 7 further comprising a tubular, substantially open, fitting associated with the processing gas outlets and projecting into the interior of the filter housing for mounting the filter cartridges thereon.

10. The fluidized bed apparatus of claim 7 wherein said filter housing is substantially cylindrical, and wherein said partition means comprises a single partition disposed substantially along a diametric plane of said filter housing, whereby said open bottom compartments are each generally semi-circular in transverse cross section.

11. The apparatus of claim 7 further comprising processing gas exhaust means for connecting each processing gas outlet to a discharge duct, said processing gas exhaust means including processing gas flow on/off valves associated with each processing gas outlet.

12. The apparatus of claim 11 wherein said processing gas exhaust means includes exhaust fittings interconnecting each processing gas outlet with a connection fitting having multiple inlets and a single outlet, said single outlet connected with said discharge duct.

13. The apparatus of claim 9 wherein each said tubular fitting comprises a mounting plate frame mounted adjacent said processing gas outlet, and a plurality of axially extending rods mounted to said mounting plate frame and extending into the interior of the filter housing for supporting said filter cartridge.

* * * * *